No. 709,497. Patented Sept. 23, 1902.
A. MITCHELL.
CHURN.
(Application filed Apr. 23, 1902.)
(No Model.) 2 Sheets—Sheet 1.
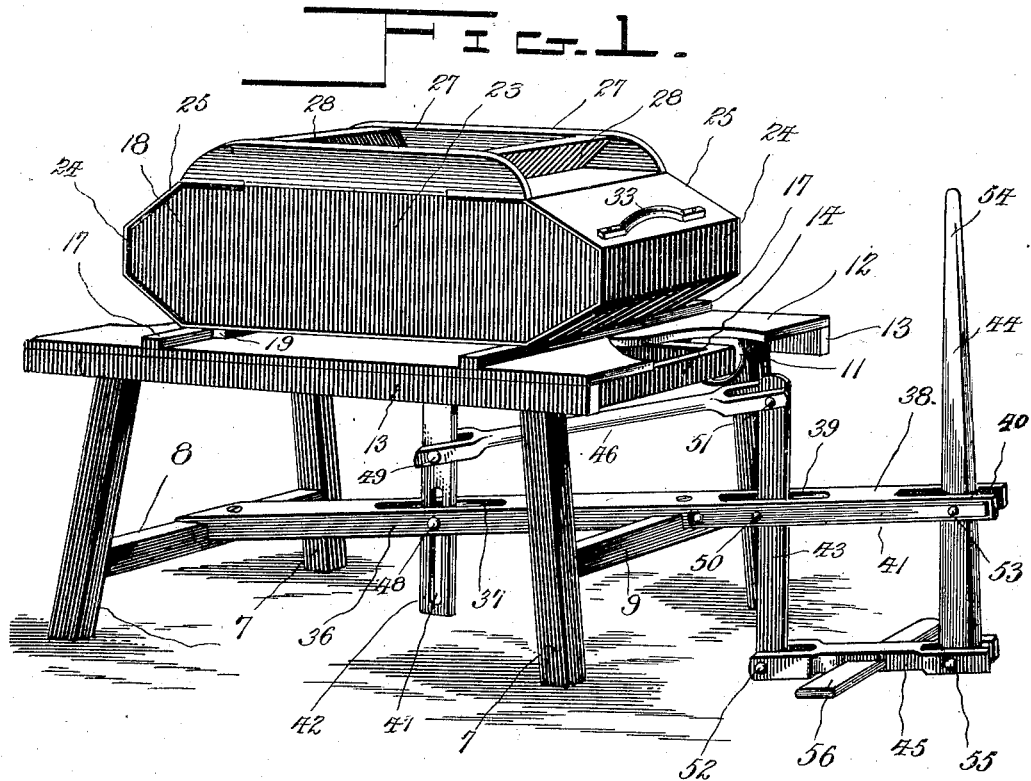
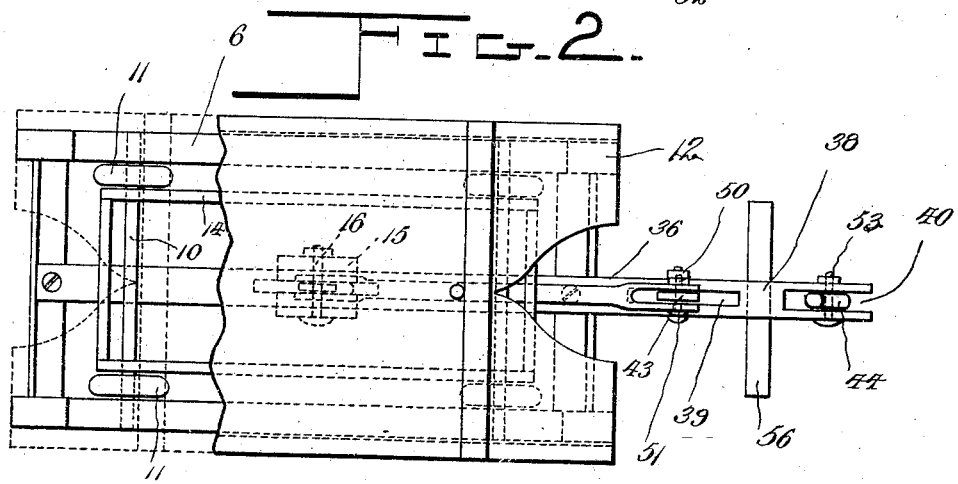
Witnesses: Alex. Mitchell, Inventor,
By Marion & Marion
Attorneys No. 709,497. Patented Sept. 23, 1902.
A. MITCHELL.
CHURN.
(Application filed Apr. 23, 1902.)
(No Model.) 2 Sheets—Sheet 2.
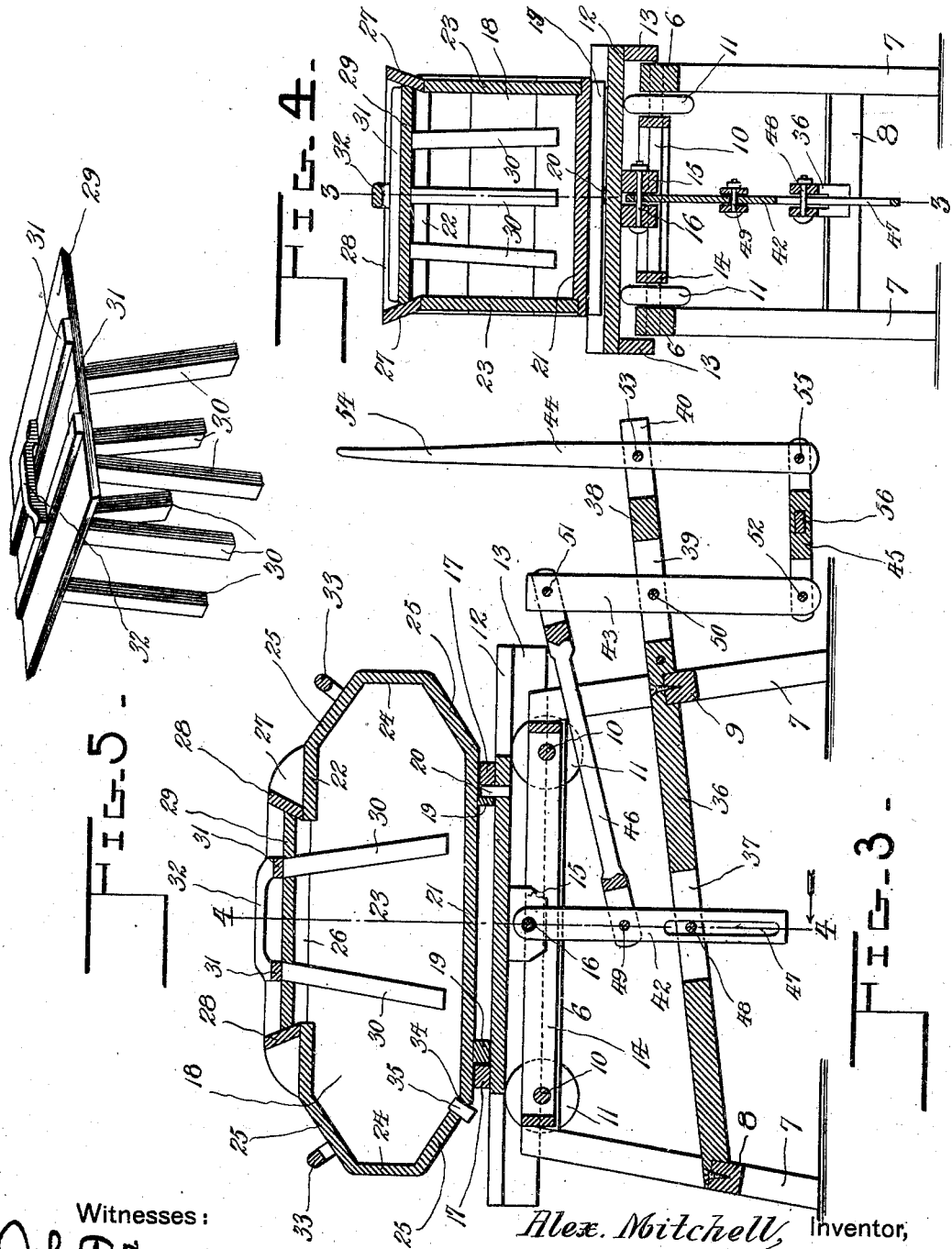
Witnesses: Alex. Mitchell, Inventor,
By Marion & Marion
Attorneys

UNITED STATES PATENT OFFICE.

ALEXANDER MITCHELL, OF OXBOW, CANADA.

CHURN.

SPECIFICATION forming part of Letters Patent No. 709,497, dated September 23, 1902.

Application filed April 23, 1902. Serial No. 104,235. (No model.)

*To all whom it may concern:*

Be it known that I, ALEXANDER MITCHELL, a subject of the King of Great Britain, residing at Oxbow, county of Assiniboia, Northwest Territories, Canada, have invented certain new and useful Improvements in Combination Churns and Clothes-Washers; and I do hereby declare that the following is a full, clear, and exact description of the invention, such as will enable others skilled in the art to which it appertains to make and use the same.

My invention relates to a combination apparatus which may be used either as a churn or clothes-washer, according to requirements of the user; and my object is to produce an apparatus of the closed-vessel reciprocating type which will have the advantages of easy running, moderate cost of manufacture, and simple construction.

My invention consists, primarily, in a stationary frame having rollers on which is reciprocably mounted a platform, and a vessel is detachably mounted on the platform, which may be used to contain either water for washing clothes or cream to be churned, as may be desired.

Another feature of my invention consists in the provision of a special form of hand and foot leverage for reciprocating the platform.

Other features of my invention will appear from the accompanying description and are particularly pointed out in the claims.

I have shown the preferred form of my invention in the accompanying drawings, wherein—

Figure 1 is a perspective view of the complete machine, showing a churning vessel mounted thereon. Fig. 2 is a plan view of the apparatus with the vessel removed and showing part of the platform broken away. Fig. 3 is a longitudinal central section of the apparatus on the line 3 3 of Fig. 4. Fig. 4 is a transverse vertical section on the line 4 4 of Fig. 3, and Fig. 5 is a perspective view of the cover of the churn vessel.

The body of the machine consists of the rectangular frame 6, having supporting-legs 7 depending from each corner thereof, and these legs may be connected together by brace bars or rungs 8 9 at each end. In the sides of the frame 6, at each end thereof, is journaled a shaft 10, which carries a pair of rollers 11, adapted to project slightly above the frame, these rollers being formed with convex peripheries, as shown in Figs. 2 and 4. Upon these rollers is rollably mounted the reciprocating platform 12, which has on each side a depending flange or rim 13, which embraces the sides of the frame 6 to hold the platform in place. If desirable, a secondary rectangular frame 14 within the frame 6 and attached to the latter may be provided to secure inside bearings for the shafts 10, as shown in Fig. 2. The platform 12 has on its under side a pair of depending tongues 15, between which is mounted a pin or bolt 16, which forms the point of attachment for the reciprocating mechanism, to be hereinafter described, and on the upper side of the platform there are attached a pair of transverse cleats or ribs 17, which form removable securing means for the wash vessel or churn-body 18, which has a pair of interlocking cleats 19 upon its lower side adapted to fit between the cleats 17, as shown, and in order to prevent the possible sidewise motion of the churn or washer body there may be provided a pin 20, which is firmly embedded in the platform and projects therefrom into an appropriate notch cut in the center of one of the cleats 19, so that when the churn or washing vessel is mounted upon the platform it cannot be moved either sidewise or lengthwise thereof, but can be readily raised to remove the same and be replaced by another, if so desired.

The churn-body shown herein consists of an oblong receptacle having parallel bottom and top 21 and 22 and longitudinal sides 23; but the ends are made of peculiar shape, and herein lies one of the essential features of my improved churn. These ends have rectangular upright central portions 24 and oblique portions 25 joining them to the top and bottom sides, as shown, the longitudinal sides 23 being chamfered or beveled at their ends to correspond with the shape of the vessel thus produced. By this peculiar shape I have found a great improvement is produced both in the rapidity and coolness with which the cream is coagulated over that form showing either rounded or squared ends, and I account for this peculiar result on the supposition that the cream is thrown violently against the successive abrupt angles formed between the boards 21, 23, 24, 25, and 22, and each shock causes a certain coagulation of the cream, while at the same time the latter is caused to pass up and around the body of the cream in the vessel, and thus to be completely turned at each reciprocation thereof. This churn-body is open at its upper side, having a charging-aperture 26 in the top board 22, which may be surrounded to strengthen the same by parallel longitudinal flanges 27 and cross-flanges 28, these flanges being all obliquely placed, so as to form a sort of funnel-shaped mouth to assist the charging of the vessel, and seated in this rectangular mouth or opening is a cover 29, which is chamfered or beveled at the edges to correspond with the batter of the flanges 28, thus forming a firm seat for said cover. The cover may be secured in place by cleats or any other suitable means; but as a slight bevel of the joint makes it sufficiently tight therein I have not shown such means in the present machine. In order to strengthen the cover, I preferably provide a pair of battens 31, covering the ends of the beaters 30, and between which is a brace in the form of a hand-cleat 32 for removal of the cover. The churn-body, as shown, is provided at each end thereof with a handle-cleat 33 to facilitate its removal from the platform and carrying it from place to place, and at its lower side it may be provided with a discharge-opening 34, closed by a plug 35, for which, of course, a draw-off cock or other equivalent means may be substituted.

When the vessel is used for washing purposes, a wringer may be attached to one of the flanges 27 or 28 and the dasher-arms 30 are ordinarily unnecessary.

The reciprocating mechanism for the platform 12 and the churn or washing vessel thereon constitutes an essential part of my invention and is mounted upon a horizontal or slightly-oblique beam 36, which is secured by nails, screws, or other fastening means and by mortised joints to the rungs 8, as shown, and this beam is longitudinally slotted at its center, as shown at 37, and extends at one end thereof beyond the frame or body of the machine, as shown at 38, and this overhanging end is slotted longitudinally at 39 and 40, and may be provided with iron or steel strengthening-ribs 41, riveted thereto. In the slots 37, 39, and 40 there are mounted three upright levers 42, 43, and 44, which are connected together by links 45 and 46, in the manner shown in the drawings and which will now be more explicitly described. The lever 42 is pivoted at its upper end upon the pin 16 and at its opposite ends provided with the longitudinal slot 47, through which is passed a pin or bolt 48, secured in the beam 36 transversely thereof, as shown, and the link 46 is likewise pivoted to the lever 42 by a pin or bolt 49, located at a suitable point intermediate of the pins 16 and 48. The lever 43 is pivoted at an intermediate point to the beam 36 by a transverse pin or bolt 50 passing through the slot 39, and this lever is likewise pivoted by a pin 51 to the link 46 at its upper end, and at its lower end by a pin 52 to one end of the link 45. The lever 44 is in the form of a hand operating-lever and is pivoted upon the end of the beam 36 by a transverse pin 53 passing through the slot 40, its upper end being prolonged to form a handhold 54 for reciprocating the platform 12, while its lower end is pivoted to the link 45 by a pin 55, and it will thus be seen that by rocking the said lever 44 the motion is transmitted through the levers 43 and 42 successively to the platform, and the latter, with the churn-body thereon, is reciprocated upon the rollers 11. In order to facilitate this rocking or reciprocating movement, I preferably provide a treadle-bar 56, which is secured transversely to the link 45 or passes through a suitable slot therein, as shown in the drawings, and thus the hand and foot may be used simultaneously and in opposite directions, thus facilitating the operation of the device.

The advantages of my improved combination churn and washer as hereinbefore set forth and its mode of operation will now be evident and will, it is thought, need no further explanation.

While I have shown in the accompanying drawings the preferred form of my invention, it will be understood that I do not limit myself to the precise form shown, for many of the details may be changed in form or position without affecting the operativeness or utility of my invention, and I therefore reserve the right to make such modifications as are included in the scope of the following claims.

Having thus described my invention, what I claim as new, and desire to secure by Letters Patent, is—

1. In a churn or like device, a reciprocating means comprising a rectangular framework mounted upon supporting-legs, transverse shafts journaled in said framework and carrying rollers thereon, a platform having depending flanges and mounted on said rollers, a lever-arm pivoted to the lower side of said platform, a slotted beam mounted longitudinally below said framework and extending beyond one end thereof, a transverse pin in said beam passing through a slot in the opposite end of said lever, a second lever pivoted at an intermediate point to said beam and connected at one end to the first said lever by an intermediate link, a hand-lever also pivoted at an intermediate point in said beam and connected to the opposite end of said second lever by a link, a treadle carried by said last-mentioned link, and means for removably securing a vessel upon said table to prevent lateral shifting thereon.

2. In a churn or like device, a reciprocating means comprising a rectangular framework mounted upon supporting-legs, transverse shafts journaled in said framework and carrying rollers thereon, a platform having depending flanges mounted on said rollers, a lever-arm pivoted to the lower side of said platform, a slotted beam mounted longitudinally below said framework and extending beyond one end thereof, a transverse pin in said beam passing through a slot in the opposite end of said lever, a second lever pivoted at an intermediate point to said beam and connected at one end to the first said lever by an intermediate link, a hand-lever also pivoted at an intermediate point in said beam and connected to the opposite end of said second lever by a link, a treadle carried by said last-mentioned link, transverse cleats mounted on said platform, and a peg projecting from the center of said platform adjacent to the side of one of said cleats.

3. A churn comprising a stationary framework having supporting-legs, rollers journaled therein, a platform having longitudinal guiding means supported upon said rollers and adapted to reciprocate thereon, a lever pivoted at one end to the lower side of said platform, a beam extending longitudinally beneath said framework and beyond one end thereof, a transverse pin upon which the other end of said lever is journaled, a hand-lever journaled in the end of said beam, a treadle connected thereto, intermediate mechanism connecting said hand-lever and treadle to said first-named lever, cleats upon the upper side of said table, and a covered vessel having interlocking cleats on its lower side to prevent lateral shifting on the platform.

In witness whereof I have hereunto set my hand in the presence of two witnesses.

ALEXANDER MITCHELL.

Witnesses:
GEORGE S. HAMES,
FRED. HAMES.